United States Patent
Fingerhut

(10) Patent No.: US 7,738,879 B1
(45) Date of Patent: Jun. 15, 2010

(54) METHOD AND SYSTEM FOR PROVIDING ENTRY NODE LOCATION IN A WIRELESS TELECOMMUNICATIONS SYSTEM

(75) Inventor: Howard Fingerhut, Mendham, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 887 days.

(21) Appl. No.: 10/021,098

(22) Filed: Dec. 12, 2001

(51) Int. Cl.
*H04Q 7/20* (2006.01)

(52) U.S. Cl. .................. 455/456.1; 455/456.2; 455/434; 455/414.3; 455/414.2; 455/517; 455/450; 455/457

(58) Field of Classification Search .............. 455/456.2, 455/434, 414.3, 414.4, 517, 456.1, 456, 450, 455/457, 456.5, 464, 426.1, 414.2, 415; 379/60, 379/39
See application file for complete search history.

(56) References Cited

U.S. PATENT DOCUMENTS

| | | | | |
|---|---|---|---|---|
| 4,670,899 | A * | 6/1987 | Brody et al. ................. | 455/453 |
| 6,463,307 | B1 * | 10/2002 | Larsson et al. .............. | 455/574 |
| 6,731,940 | B1 * | 5/2004 | Nagendran ................ | 455/456.1 |
| 2002/0077105 | A1 * | 6/2002 | Chang ......................... | 455/436 |
| 2002/0077118 | A1 * | 6/2002 | Zellner et al. ................ | 455/456 |
| 2003/0003909 | A1 * | 1/2003 | Keronen et al. .............. | 455/434 |
| 2003/0134648 | A1 * | 7/2003 | Reed et al. ................... | 455/456 |
| 2006/0161626 | A1 * | 7/2006 | Cardina et al. .............. | 709/206 |

* cited by examiner

*Primary Examiner*—Charles N Appiah
*Assistant Examiner*—Randy Peaches

(57) ABSTRACT

A method and system are described for providing a wireless telecommunications service provider with location information of a mobile service subscriber. When a mobile subscriber device acknowledges receipt of a data packet received at the mobile device, or when the mobile device originates a transmission, the cellular telecommunications site, or base station, receiving the acknowledgement or transmission serves as an entry node into the telecommunications system. Resource identification information for the entry node is extracted from billing message traffic logs and is exposed to the service provider. The service provider uses the resource identification information to find the location of the entry node in an entry node information database. Alternatively the location may be provided with the resource identification information. Provision of location information allows the service provider to know that its mobile subscriber is located in the area covered by that particular entry node.

17 Claims, 2 Drawing Sheets

METHOD AND SYSTEM FOR PROVIDING ENTRY NODE LOCATION IN A WIRELESS TELECOMMUNICATIONS SYSTEM

FIELD OF THE INVENTION

This invention relates to a method and system for providing entry node location information to service providers in a wireless telecommunications system to allow service providers to ascertain the location of their mobile subscribers.

BACKGROUND OF THE INVENTION

With the advent of wireless telecommunications networks, mobile telephones, personal digital assistants, a variety of pagers and instant messaging devices have been developed and are widely used. Users of such mobile telecommunications devices commonly subscribe to the services of host service providers for a wide variety of services and applications. For example, a host service provider may provide electronic mail services, instant messaging services, and a range of information and data, including business information, educational information, sports information, weather information, and the like.

The mobile nature of such mobile telecommunications devices creates a difficult network and services management situation for operators of wireless telecommunications services and for host service providers. One particular problem is the density of mobile devices in any given area. For example, hundreds or thousands of users of personal digital assistants may crowd into a single building or city block, such as Wall Street, and request the services of a host service provider in the business of providing stock quotes. On the other hand, a small number of mobile device users may be located in a wide rural area requesting the same services. Because the host service provider has no knowledge of the locations of individual mobile device users, the service provider has difficulty determining the proper utilization of telecommunications services for providing services to the various users.

The service provider may rely on general anectodotal information as to the general density of subscribers in a given area, but due to the mobile nature of such devices, the service provider has very little real time information. If hundreds of mobile subscribers flood into an area in which the service provider typically only provides services to a small number of subscribers, the telecommunications system in that area may be overburdened, and the services provider will have no knowledge or information that the problem has occurred.

A secondary problem associated with the service provider's lack of knowledge as to the location of wireless subscribers is an inability for service providers to transmit advertising or other helpful information to subscribers based on commercial and other services available in the area in which the mobile subscribers are currently located.

These problems are exacerbated by the data handling capacity of wireless telecommunications systems. Typically, a host service provider which may be a wireless service provider, an application service provider, an Internet service provider, and the like, is connected to a mobile telecommunications switch through a high capacity and high speed data link. On the other hand, the mobile switch may be connected to a cellular telecommunications site (antenna) through a significantly lower capacity data link, and ultimately information is passed from the antenna to the wireless subscriber via an over-the-air radio link that has significantly less capacity for transmitting data to the wireless subscriber. Under such conditions, data sent from a host subscriber typically must be buffered at the wireless switch and then transmitted over the radio link to the wireless subscriber according to the capacity of the radio link. In circumstances where the density of wireless subscribers in a given area becomes very high, as described above, data buffers become overburdened and wireless telecommunications services often fail. Service providers often deal with these problems by attempting to create efficiently sized software applications, and by setting up guidelines for minimizing the flooding of data buffers and wireless switches.

Prior methods have been utilized to provide location information of mobile device users. For example, global positioning satellites may be used to provide a very precise location of a given mobile device. However, the mobile device must include an expensive GPS receiver, and often GPS systems may not work properly in certain areas, such as in shadowed areas behind buildings and other structures. Other methods have used information provided to mobile 911 services, but these methods suffer from the obvious danger of overloading systems set in place for emergency operations. Other systems have used triangulation based on signals from the mobile device, but such systems are energy inefficient and cause extensive mobile device battery use.

Still other systems have provided service providers with location information on a mobile device as a user-initiated system. That is, according to some systems, the user of the mobile device may enter a location indicator, such as a zip code or address, and that information is inserted into a software application resident on the mobile device. The information is, in turn, transmitted to the service provider through the mobile telecommunications system. The problem for such a user-initiated system is that the user must take the time and effort to insert the location information, and for any user who fails to insert location information, that user's location will remain unknown to the service provider.

Accordingly, there is a need for a method and system for efficiently providing service providers with location information of mobile subscribers so that the service provider may determine the density of mobile users in a given area, and so that the service provider may send helpful information to subscribers on services and items of interest located in the area in which the mobile subscriber is operating.

It is with respect to these and other problems that the present invention has been made.

SUMMARY OF THE INVENTION

In accordance with the present invention, the above and other problems are solved by a method and system for providing a service provider in a wireless telecommunications system with location information of a mobile service subscriber. Location information is provided to service providers based on wireless acknowledgements from mobile subscribers through entry nodes of the telecommunications system. When a mobile subscriber device acknowledges receipt of a data packet received at the mobile device, or when the mobile device originates a transmission, the cellular telecommunications site, or base station, receiving the acknowledgement or transmission serves as an entry node into the telecommunications system.

Resource identification information for the entry node is extracted from message traffic logs and is exposed to the service provider. The service provider uses the resource identification information for the entry node to find the location of the entry node in an entry node information database. Alternatively, location information for a given entry node may be maintained at the entry node and may be supplied directly to the service provider along with a transmission to the service provider or along with an acknowledgement of receipt of a transmission from the service provider. Provision of location information for that entry node to a service provider allows the service provider to know that its mobile subscriber is located in the area covered by that particular entry node. Thus, the service provider is able to better manage the speed, volume, frequency and content of the data it passes through the wireless telecommunications network to wireless subscribers operating under a given entry node. And, the service provider may transmit helpful information such as commercial advertising and other items of interest available to subscribers in the general area in which those subscribers are located.

According to another aspect, third parties, such as law enforcement agencies and commercial marketing businesses, may subscribe to the location information. For example, law enforcement agencies may use the location information for location of and/or surveillance of a mobile user. Commercial marketing companies may use the information to pass advertising to mobile subscribers, or to learn valuable information about potential customer density in a given geographical area.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

The following description of an exemplary embodiment of the present invention is made with reference to the above-described drawings wherein like numerals refer to like parts or components throughout the several figures. The present invention is directed toward a method and system for providing a service provider in a wireless telecommunications system with location information of a mobile service subscriber. Location information is provided to service providers based on wireless acknowledgements from mobile subscribers through entry nodes of the telecommunications system. When a mobile subscriber device acknowledges receipt of a data packet received at the mobile device, or when the mobile device originates a transmission, the cellular telecommunications site, or base station, receiving the acknowledgement or transmission serves as an entry node into the telecommunications system. Provision of location information for that cell site/base station/entry node, hereafter "entry node", to a service provider allows that service provider to know that its mobile subscriber is located in the area covered by that particular entry node.

By knowing the entry node location of each mobile subscriber, a given service provider is able to better manage the data it passes data through the wireless telecommunications network to wireless subscribers operating under a given entry node. For example, based on the information received, if the service provider realizes that the density of wireless subscribers under a given entry node will overburden the capabilities of the wireless telecommunications system for sending data to those subscribers, the service provider may alter the frequency and volume of data transmitted to wireless subscribers in that area to reduce flooding of data buffers and other components of a wireless telecommunications system. Additionally, the service provider may now transmit helpful information such as commercial advertising and other items of interest available to subscribers in the general area in which those subscribers are located. Third parties, such as law enforcement agencies and commercial marketing businesses, may subscribe to the location information to track the general location of a mobile subscriber for a variety of purposes including surveillance and advertising.

Figure 1:
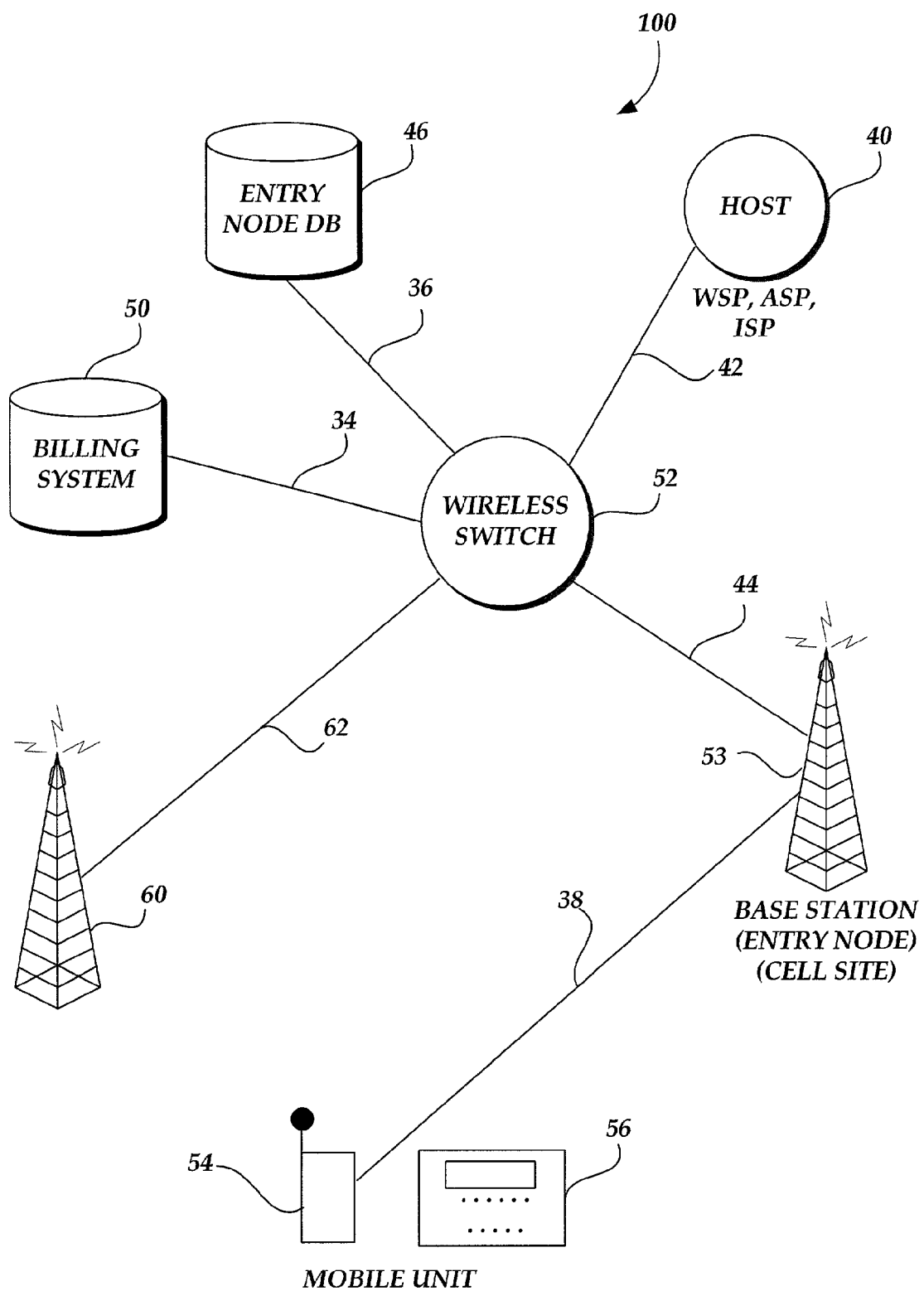
FIG. 1 is a simplified block diagram illustrating some of the components of a wireless telecommunications network that provides an exemplary operating environment for the present invention.

FIG. 1 is a simplified block diagram illustrating some of the components of a wireless telecommunications network 100 that provides an exemplary operating environment for the present invention. The wireless telecommunications network 100, such as a cellular network, comprises a mobile wireless switching center 52. The mobile switch 52 is a switch providing coordination between the components of the network 100 and coordination and communication between the network 100 and external wireless and wireline networks.

Connected to the wireless switch 52 is a host 40. The host 40 may be any suitable intelligent network computing device operated by a service provider for providing a variety of services to subscribers. The host 40 preferably includes a multipurpose computer system capable of two-way access to subscriber devices and other components of the telecommunications system. The host 40 may serve as a platform for providing a variety of software applications, messaging and electronic mail services. The host 40 may be operated by the provider of the telecommunications system 100. Or, the host 40 may be operated by a third party service provider such as a wireless service provider, an application service provider, or an Internet service provider for providing electronic mail, instant messaging, application services, and the like, to wireless subscribers utilizing mobile units 54, 56. Alternatively, the host 40 may be operated by or provide information to a variety of third parties, such as law enforcement agencies and commercial marketing businesses. Such third parties may subscribe to the location information for a number of different purposes. For example, law enforcement agencies may use the information for location of and/or surveillance of a mobile user. Commercial marketing companies may use the information to pass advertising to mobile subscribers or to learn valuable information about potential customer density in a given geographical area. Communications between the host 40 and the wireless switch 52 travel over a data link 42 which may carry data at a relatively high volume and speed. For example, according to an exemplary embodiment, the data link 42 may be a 56 Kbps which is a 64,000 bit per second digital circuit with 8,000 bits per second used for signaling. The data link 44 between the wireless switch 52 and the base station 53 may also be a high speed, high volume data link for transmitting signaling and messages from the wireless switch to the base station 53. On the other hand, the over-the-air link 38 is a radio link between the base station 53 and the mobile units 54, 56. The radio link 38 has a much lower data transmission capacity, and consequently, memory storage buffers preferably are positioned at various components in the system such as the wireless switch 52 and the base station 53 for holding data and signaling until that data and signaling may be routed to the mobile units 54, 56 over the radio link 38.

The base stations 53, 60 are typical cell sites that include transmitters and receivers operated by a wireless service provider through which the radio links are established between the wireless system 100 and the wireless units 54, 56. The area served by a given base station or cell site 53 is often referred to as a cell. The base station or cell site typically consists of an antenna tower, transmission radios and radio controllers.

The mobile unit 54 may be any wireless telephone operable for receiving and transmitting wireless telephone communications. The mobile unit 56 is illustrative of a personal digital assistant on which a user may operate a number of software applications and receive data, instant messaging, paging, etc.

According to an exemplary embodiment, data transmitted between components of the telecommunications system 100 is transmitted according to packet switching protocols. Packet switching includes sending data in the form of packets through the network from one location to another. Operation of packet switched networks is well known to those skilled in the art. In operation, data and messages may be sent from one mobile unit 54 to a second mobile unit 56 through the wireless telecommunications system 100. Likewise, the mobile units 54, 56 may send and receive voice and data transmissions to and from wireline communication devices.

When a voice or data transmission is sent to the mobile units 54, 56, the mobile units 54, 56 send a radio frequency acknowledgement to the base station 53, and the base station 53 sends a positive acknowledgement to the wireless switch 52 and on to the source of the original message, such as the host 40. Likewise, when a transmission is originated from the mobile units 54, 56 that transmission enters the telecommunications system 100 through the base station 53 and on to other subscribers or hosts by way of the wireless switch 52. In either case, the base station 53 serves as an entry node into the telecommunications system 100 for access by transmissions from the wireless units 54, 56. When a message is sent from the mobile units 54, 56, whether an original message or a response message, the message in the form of a subscriber data packet is transmitted through the entry node 53 and into the telecommunications system 100. Once the subscriber data packet hits the entry node 53, a traffic log is created at the entry node 53 that contains among other things, resource identification information identifying the entry node 53. The traffic log accompanies the subscriber data packet through the telecommunications network 100 to the wireless switch 52.

The switch 52 is connected to a billing system 50 where the switch forwards billing information for calls and data transmissions processed through the switch 52. For preparation of billing, the switch creates call detail records (CDR) that are transmitted to the billing system 50 for preparation of periodic wireless subscriber billing. The subscriber's telecommunications service provider is generally responsible for maintaining records for both local and long distance wireless services and for producing billing statements for individual subscribers. The billing system, otherwise known as a call accounting system, includes computer systems, memory storage, software, and some mechanical methods for connection to the telecommunications network described with respect to FIG. 1. A billing system 50 is used to record information about telephone calls and data transmissions, organize that information, and upon being asked, prepare statements related to subscriber use of telecommunications services.

The information recorded or captured about call processing includes all information required to prepare periodic billing statements to subscribers for use of telecommunications services. Representative information includes type, data, time, duration, originating point and terminating point for telephone calls combined with subscriber information, such as calling plans provided by a subscriber, and the like. Information may be downloaded from the mobile switch 52 to the billing system 50 in association with the preparation of the billing statements. The operation of a billing system of a telecommunications service provider, such as the billing system 50, is well-known to those skilled in the art.

Typically, resource identification information related to a particular base station 53 under which a mobile unit 54, 56 operates is provided by the mobile switch 52 to the billing system 50 so that the telecommunications service provider may have information related to utilization of its systems, such as the base station (entry node) 53. However, resource identification information typically is not forwarded to third party service providers such as the host 40. In accordance with the present invention, however, resource identification information is separated from the call data record submitted to the billing system 50 and is forwarded to the host 40 along with an acknowledgement, return data transmission, or original data transmission from the mobile unit 54, 56 to the host 40. The host 40 may then utilize resource identification information on the entry node 53 to look up the precise location of the entry node 53 in the entry node database 46. Alternatively, the location of an entry node may be included in the resource identification information provided by the entry node. Accordingly, once the resource identification information is received by the host 40, the host 40 will have the location of the entry node 53 without querying the entry node database.

Once the host 40 has determined the precise location of the entry node 53, the host 40 may then determine the location of the mobile units 54, 56 based on the coverage area of the entry node 53. That is, if the entry node 53 covers an area one mile in diameter around the precise location of the entry node 53, the host 40 may determine that the mobile units 54, 56 are indeed located within that one-mile diameter area.

Figure 2:
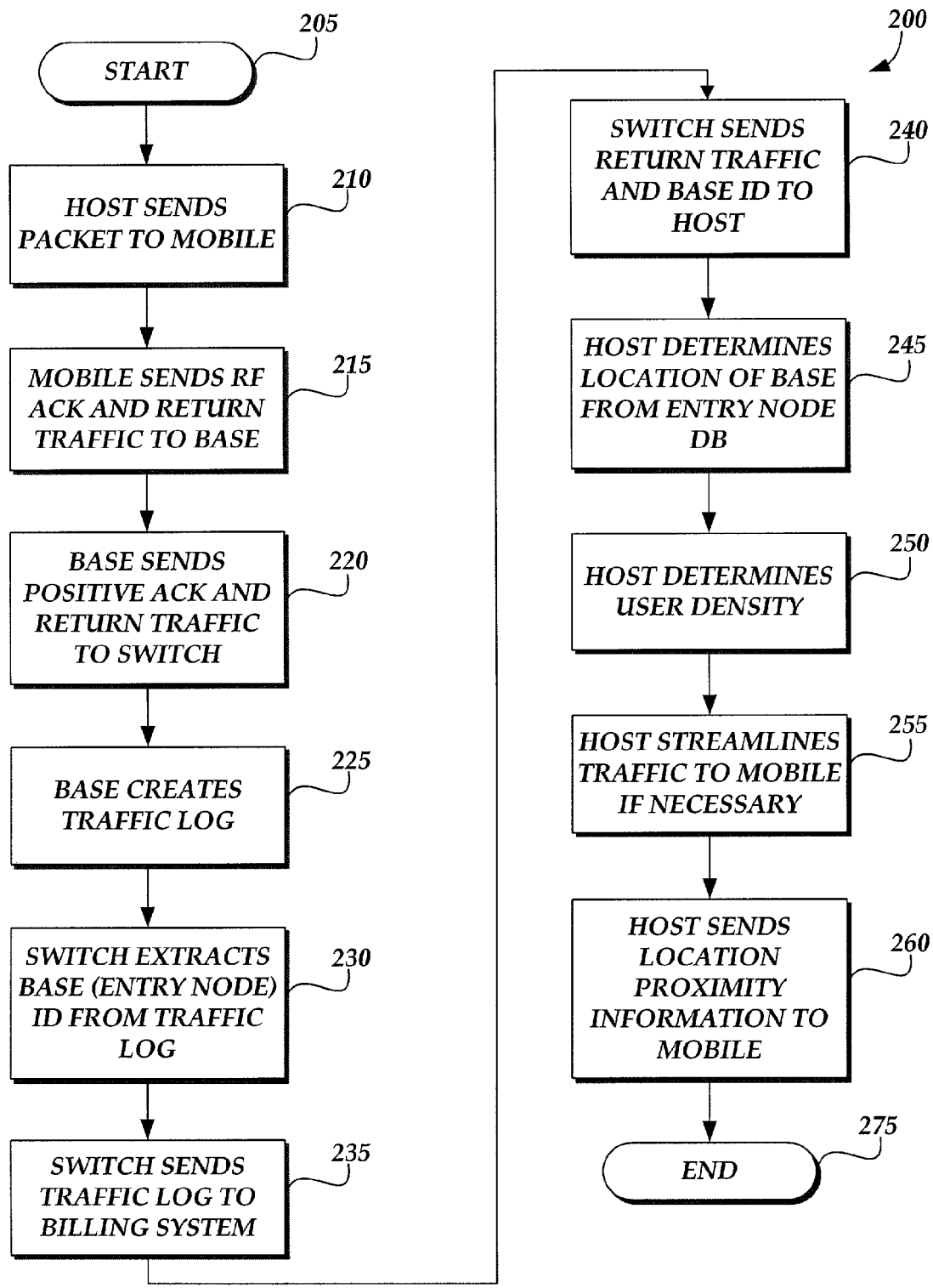
FIG. 2 illustrates operational flow of the steps performed by a system and method of the present invention in providing a host service provider with location information of a mobile subscriber.

Having described an exemplary operating environment for the present invention with reference to FIG. 1, FIG. 2 illustrates operational flow of the steps performed by the system and method of the present invention in providing a host service provider with location information of a mobile subscriber. The method 200 begins at step 205 and proceeds to step 210 where a host 40 sends a data packet to a mobile unit 56. For purposes of example, the host 40 may be an application service provider sending the subscriber and user of the mobile unit 56 stock quote information via a stock quotes application. The mobile unit 56 may be any mobile electronic device suitable for sending and receiving information through the wireless telecommunications system 100, such as a personal digital assistant. The packeted data sent from the host 40 to the mobile unit 56 is forwarded through the wireless switch 52 to the base station 53. At the base station 53, the data is sent over the radio link 38 to the mobile unit 56.

At step 215, the mobile unit 56 receives the data from the host 40 and responds to the host 40 with a subscriber data packet and a radio frequency acknowledgement to the base station 53. As should be understood by those skilled in the art, the subscriber data packet may include data input by the subscriber into the mobile unit 56 in response to data received from the host 40. When the base station 53 receives the radio frequency acknowledgement and subscriber data packet from the mobile unit 56, the base station 53 serves as an entry node into the wireless telecommunications system 100 for the subscriber data packet transmitted from the mobile unit 56. At step 220, the base station 53 sends a positive acknowledgement along with the subscriber data packet to the mobile switch 52. At step 225, the base station 53 creates a traffic log to track movement of the subscriber data packet through the telecommunications system 100.

The traffic log is sent to the switch 52 along with the positive acknowledgement and subscriber data packet. The traffic log created at step 225 contains resource identification information on each component of the telecommunications system 100 through which the subscriber data packet travels. Accordingly, resource identification information for the base station 53 (entry node for the subscriber data packet) is contained in the traffic log created at step 225. At step 230, the mobile switch 52 extracts the resource identification information for the base station 53 from the traffic log for subsequent forwarding to the host 40. At step 235, the traffic log is forwarded to the billing system 50 for creation of billing records associated with the present telecommunications transmissions.

At step 240, the mobile switch 52 sends the subscriber data packet, the positive acknowledgement and the resource identification information for the base station (entry node) 53 to the host 40. At step 245, the host 40 accesses the entry node data base 46 and uses the resource identification information for the base station 53 to find the location of the base station 53. If, according to an alternative embodiment, the location information is included with the resource identification information generated at the entry node 53, then the host 40 will have the location of the entry node and accessing the entry node database will not be necessary. As should be understood by those skilled in the art, the location may be in the form of latitude and longitude coordinates, GPS coordinates, or any suitable mapping or address system for locating the base station 53.

At step 250, the host 40 determines the density of mobile subscribers in the area covered by the base station 53. That is, if the area covered by the base station 53 is one mile in diameter about the location of the base station 53, the host 40 determines the number of its mobile subscribers operating within that one-mile diameter area. At step 255, the host 40 streamlines data transmission frequency, speed, content, volume and size, if necessary, to more efficiently serve its mobile subscribers. For example, if the host 40 determines that the density of the mobile subscribers in the area covered by the base station 53 is such that the wireless telecommunications system 100 will be overburdened by transmissions from the host 40 to its mobile subscribers, the host 40 may modify its data transmissions to its mobile subscribers to avoid flooding the memory buffers and other components of the telecommunications system 100. Other streamlining actions may include reducing graphics content of applications provided by the service provider, data compression, reducing or eliminating unnecessary message headers, and the like.

At step 260, the host 40 may provide helpful information to the mobile subscriber utilizing the mobile unit 56. For example, the host 40 may forward a list of popular restaurants, theaters and retail locations located in the area covered by the base station 53 that may be of interest to the mobile subscriber while she is operating her mobile unit 56 within the area covered by the base station 53.

If the host 40 is operated by a third party subscriber to the location information or if the third party subscribes to the information gathered by the host 40, the third party may utilize the location information for a variety of purposes. For example, if a law enforcement agency has subscribed to the location information for surveillance of the mobile subscriber, the agency may now send officers to the area covered by the entry node to locate the mobile subscriber. If a third party marketing business has subscribed to the location information, the marketing business may determine that more gas stations are needed in a given area, for example, based on the density of mobile telephone subscribers in a given area. These examples are for description only and are not restrictive of the numerous third party uses to which the location of a mobile subscriber may be put.

In accordance with an exemplary embodiment, if the mobile subscriber moves the mobile unit 56 to a different location such that the mobile unit 56 is operating under a different base station, the location of that base station will be determined. For example, if the user of the mobile unit 56 moves the mobile unit 56 into the coverage area of the base station 60, the next transmission sent from the mobile unit 56 will be sent through the base station 60 as the new entry node into the telecommunications system 100. As described for the base station 53 above, resource identification information for the entry node (base station 60), will be forwarded to the host 40 which will, in turn, determine the location of the entry node 60, and consequently, the location of the wireless unit 56 and subscriber. The method ends at step 275.

As described, a system and method are provided for exposing resource identification information to a service provider in a wireless telecommunications system to enable the service provider to determine the locations of wireless subscribers based on entry node locations through which subscriber wireless units are operated. It will be appreciated by those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method for providing entry node location information to a service provider in a wireless telecommunication system, comprising receiving a radio frequency acknowledgment from a wireless device at a wireless telecommunications entry node;

receiving a subscriber data packet from the wireless device at the wireless telecommunications system entry node;

extracting resource identification information from call record data and forwarding said resource identification information to a service provider host; and sending resource identification information for the entry node to a service provider based on the radio frequency acknowledgment;

wherein the location of the entry node is determined based on the resource identification information from the entry node, wherein determining the location of the entry node based on the resource identification information from the entry node includes extracting the location of the entry node from the resource identification information without querying a database in communication with the entry node, the database storing location information.

2. The method of claim 1, further comprising determining the number of service provider subscribers operating in the location of the entry node.

3. The method of claim 2, further comprising modifying data transmitted to the subscribers to reduce overburdening components of the telecommunications system based on the number of the subscribers operating in the location of the entry node.

4. The method of claim 3, wherein modifying the data further comprising altering the frequency, volume and content of data transmitted to the subscribers based on the number of the subscribers operating in the location of the entry node.

5. The method of claim 1, further comprising sending entry node location information to service provider subscribers operating in the location of the entry node.

6. The method of claim 5, wherein sending entry node location information to service provider subscribers includes sending commercial and non-commercial information related to an area covered by the entry node.

7. The method of claim 1, further comprising sending entry node location information to third party subscribers of location information on operators of wireless devices located within a service area of the wireless telecommunications system entry node.

8. The method of claim 1, after receiving the subscriber data packet at the wireless telecommunications system entry node the method further comprising:
creating a traffic log at the entry node including resource identification information on the entry node; and
sending the traffic log, the subscriber data packet, and a positive acknowledgement from the entry node to a mobile switch.

9. A mobile switch for providing entry node location information to a service provider in a wireless telecommunications system, comprising:
means for receiving a subscriber data packet and a radio frequency acknowledgement from a wireless device to a wireless telecommunications system entry node;
means for sending resource identification information for the entry node to the service provider based on the radio frequency acknowledgment through the wireless telecommunications entry node; and
means for extracting resource identification information from call record data and forward said resource identification information to a service provider host, wherein the forward resource identification information is used to determine the location of the entry node, wherein the location of the entry node is determined by extracting the location of the entry noted from the resource identification information without querying a database in communication with the entry node, the database storing location information.

10. The mobile switch of claim 9, further comprising a service provider host operative
to determine the location of the entry node based on the resource identification information from the entry node;
to determine the number of service provider subscribers operating in the location of the entry node; and
to modify data transmitted to the subscribers to reduce overburdening components of the telecommunications system based on the number of the subscribers operating in the location of the entry node.

11. The mobile switch of claim 10, wherein the service provider host is further operative to modify the frequency, speed, volume and content of data transmitted to the subscribers based on the number of the subscribers operating in the location of the entry node.

12. The mobile switch of claim 10, wherein the service provider host is further operative
to send entry node location information to service provider subscribers operating in the location of the entry node.

13. The mobile switch of claim 9, wherein the entry node is a wireless telecommunications system antenna site and is operative
to create a traffic log including resource identification information on the entry node; and
to send the traffic log, the subscriber data packet, and a positive acknowledgement to the mobile switch.

14. A method for providing entry node location information to a service provider in a wireless telecommunication system, comprising
receiving an acknowledgement and a subscriber data packet from a wireless device at a wireless telecommunications system entry node;
at the entry node, creating a traffic log, including resource identification information on the entry node;
extracting the resource identification information from the traffic log; and
sending the subscriber data packet, a positive acknowledgement and the extracted resource identification information from the entry node to a service provider;
wherein the location of the entry node is determined based on the resource identification information by extracting the location of the entry node from the resource identification information without querying a database in communication with the entry node, the database storing location information.

15. The method of claim 14, further comprising,
at the service provider, determining the number of service provider subscribers operating in the location in the entry.

16. The method of claim 15, further comprising modifying data transmitted to the subscribers to reduce overburdening components of the telecommunications system based on the number of the subscribers operating in the location of the entry node.

17. The method of claim 14, wherein sending entry node location information to service provider subscribers includes sending commercial and non-commercial information related to an area covered by the entry node.

* * * * *